E. L. BRYANT.
LAMP-BURNER.
No. 187,595. Patented Feb. 20, 1877.
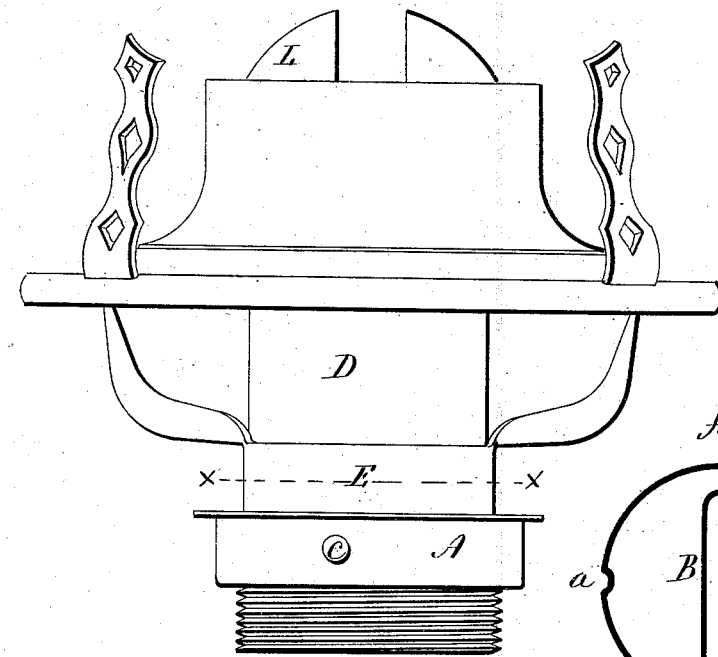
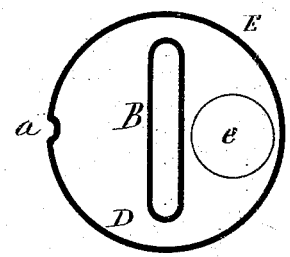
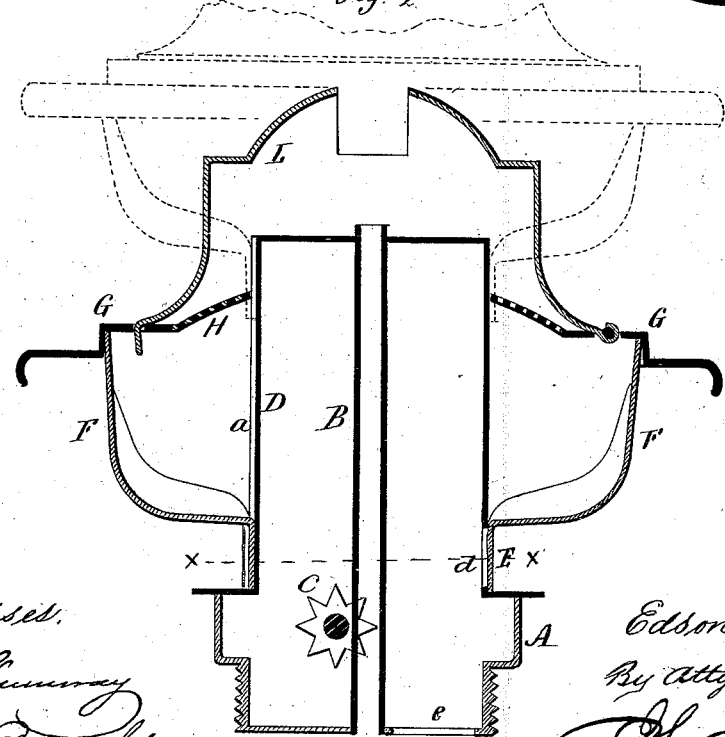
Witnesses,
J. H. Shumway
Clara Troughton.
Edson L. Bryant, Inventor
By Atty.
John S. Earle.

UNITED STATES PATENT OFFICE.

EDSON L. BRYANT, OF ANSONIA, CONNECTICUT, ASSIGNOR TO WALLACE & SONS, OF SAME PLACE.

IMPROVEMENT IN LAMP-BURNERS.

Specification forming part of Letters Patent No. 187,595, dated February 20, 1877; application filed December 20, 1876.

*To all whom it may concern:*

Be it known that I, EDSON L. BRYANT, of Ansonia, in the county of New Haven and State of Connecticut, have invented a new Improvement in Lamp-Burners; and I do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, a vertical central section; and in Fig. 3, a transverse section on line $x\,x$.

This invention relates to an improvement in burners for lamps designed for the use of kerosene and similar oils, and to that class which employ a chimney, the object of the invention being to trim or light the wick without the removal of the chimney.

The invention consists in a vertical cylinder around the wick-tube, combined with a chimney-rest and deflector, arranged upon a sleeve movable on said vertical cylinder, so that, by raising said sleeve, the chimney and deflector will be elevated above, and so as to expose the end of the wick for lighting or trimming, and the return of the sleeve will bring the chimney and deflector into their proper relative position to the wick-tube; also, in constructing the said cylinder with an aperture covered by the said sleeve when in its normal condition, which said aperture affords a means for filling the lamp when the sleeve is raised, all as more fully hereinafter described.

A is the base of the burner, provided with the usual screw-thread, with the wick-tube B and wick-adjuster C, all substantially in the usual manner. Vertically around the wick-tube there is arranged a cylinder, D, closed at the top, near the end of the wick-tube. Around this cylinder a sleeve, E, is arranged to slide freely up and down, and guided in such movement by a groove or rib, $a$, in the cylinder, as seen in Fig. 3. From this sleeve two or more arms, F, extend outward and upward, and to which the chimney-rest G is securely attached, the chimney rest or platform preferably extending in, so as to form the perforated air-distributer H around the cylinder D. On the chimney-rest the deflector L is arranged in substantially the usual manner.

When the sleeve E is in its lower position, as indicated in the drawings, the air-distributer closes around the cylinder, and the chimney-rest and deflector are in their proper relative position to the wick-tube, as seen in the drawings.

When it is desired to light or trim the wick, the sleeve, with the chimney-rest and deflector, are raised, as indicated in broken lines, Fig. 2, exposing the end of the wick beneath the chimney-rest, and when the trimming or lighting has been performed, the parts are moved down again.

The cylinder and sleeve form a strong guide for the movement and support of the parts.

Through one side of the cylinder, near the bottom, a perforation, $d$, is made, but so as to be covered by the sleeve when down in place; but when raised, as indicated in broken lines, the aperture $d$ is exposed, and through this the spout of the filler may be introduced to fill the lamp. A similar aperture for the passage of the oil is formed through the base of the burner, as at $e$. Thus the lamp may be filled without unscrewing the burner or removing the chimney.

This method of opening and closing the aperture $d$ for filling does not necessitate the raising of the chimney and deflector, but may be used in a burner in which the chimney-rest and deflector are stationary, it only being necessary to provide the aperture $d$ with a suitable cover to open and close it, as occasion may require. The device shown, however, is preferable to any other.

I do not wish to be understood as broadly claiming a lamp-burner constructed so as to permit the filling of the lamp without the removal of the burner, as such I am aware is not new.

I claim—

1. In a lamp-burner, the combination of a vertical guide-cylinder around the wick-tube, a sleeve movable vertically on said cylinder, a chimney-rest and deflector attached to the said sleeve, and movable therewith relatively to the wick-tube, substantially as described.

2. The combination, in a lamp-burner, of a cylinder around the wick-tube, the said cylinder constructed with a filling-aperture, and provided with a cover for opening and closing said aperture, substantially as specified.

EDSON L. BRYANT.

Witnesses:
FREDK. L. GAYLORD,
C. C. JACKSON.